US012106878B2

(12) United States Patent
Tener et al.

(10) Patent No.: US 12,106,878 B2
(45) Date of Patent: Oct. 1, 2024

(54) MAGNETOCALORIC REGENERATORS COMPRISING MATERIALS CONTAINING COBALT, MANGANESE, BORON AND CARBON

(71) Applicant: The Florida State University Research Foundation, Inc., Tallahassee, FL (US)

(72) Inventors: Zachary P. Tener, Tallahassee, FL (US); Mykola Abramchuk, Brighton, MA (US); Xiaoyan Tan, Highland Park, NJ (US); Michael Shatruk, Tallahassee, FL (US); Sumohan Misra, Ludwigshafen (DE); Daniel Barrera-Medrano, Ludwigshafen (DE)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 1240 days.

(21) Appl. No.: 16/316,793

(22) PCT Filed: Jul. 11, 2017

(86) PCT No.: PCT/EP2017/067367

§ 371 (c)(1),
(2) Date: Jan. 10, 2019

(87) PCT Pub. No.: WO2018/011189

PCT Pub. Date: Jan. 18, 2018

(65) Prior Publication Data

US 2019/0252097 A1 Aug. 15, 2019

(30) Foreign Application Priority Data

Jul. 11, 2016 (EP) .................................... 16178872

(51) Int. Cl.
*H01F 1/01* (2006.01)
*C22C 19/00* (2006.01)
*C22C 19/07* (2006.01)

(52) U.S. Cl.
CPC ........... *H01F 1/015* (2013.01); *C22C 19/005* (2013.01); *C22C 19/07* (2013.01); *C22C 2202/02* (2013.01)

(58) Field of Classification Search
CPC ... B21B 45/08; C21D 6/004; B22F 2301/155; B22F 2301/15; C22C 19/005;
(Continued)

(56) References Cited

U.S. PATENT DOCUMENTS 8,763,407 B2 7/2014 Carroll et al.
2011/0041513 A1* 2/2011 Reesink ................. H01F 1/015 62/3.1

(Continued)

FOREIGN PATENT DOCUMENTS

JP 59047342 A * 3/1984

OTHER PUBLICATIONS

T. Kanomata et al., Magnetovolume effect of Co2B, Journal of Alloys and Compounds, vol. 259, Issues 1-2, 1997, pp. L1-L4 (Year: 1997).*

(Continued)

*Primary Examiner* — Keith Walker
*Assistant Examiner* — Stephani Hill
(74) *Attorney, Agent, or Firm* — Eversheds Sutherland (US) LLP

(57) ABSTRACT

Described is a magnetocaloric regenerator comprising one or more materials containing cobalt, manganese and boron and optionally carbon.

5 Claims, 8 Drawing Sheets

(58) Field of Classification Search
CPC ... C22C 19/07; C01B 35/04; F25B 2321/002; C01G 51/006
USPC .......................................................... 420/435
See application file for complete search history.

(56) References Cited

U.S. PATENT DOCUMENTS

| | | | |
|---|---|---|---|
| 2014/0202171 | A1 | 7/2014 | Carroll et al. |
| 2016/0109164 | A1 | 4/2016 | Carroll et al. |

OTHER PUBLICATIONS

V. V. Khovaylo, etal. "Magnetocaloric effect in "reduced" dimensions: Thin films, ribbons, and microwires of Heusler alloys and related compounds." physica status solidi (b) 251.10 (2014): 2104-2113. (Year: 2014).*
Yoshida et al. The magnetic and electric properties of (Co1—xMnx)2B crystalline compounds and amorphous alloys. Science reports of the research institutes, Tohoku University, Ser. A, Physics, chemistry, and metallurgy. vol. 33, No. 1, pp. 36-48. Mar. 26, 1986. (Year: 1986).*
JP S59-047342 written and machine translation (Year: 1984).*
Yoshihisa et al. Magnetic moment and curie temperature of amorphous (Co1—xMnx)100-yBy alloys. The 1751th report of the Research Institute for Iron, Steel and Other Metals. Received Dec. 11, 1982. pp. 36-46. (Year: 1982).*
Obi et al. Magnetic properties of amorphous Co—Mn—B alloys. IEEE Transactions on Magnetics, vol. Mag-16, No. 5, Sep. 1980. pp. 1132-1134. (Year: 1980).*
Kadomatsu et al. Magnetization, lattice constants and hydrostatic pressure effect on the curie temperature of (Co1—xMnx)2B. J. Phys. Soc. Jpn. 47, pp. 1078-1085 (1979). Abstract. (Year: 1979).*
Zhao et al. Phase evolution and magnetocaloric effect of melt-spun Mn3Sn2—xMx (M=B,C; x=0-0.5) ribbons. Journal of Applied Physics 111, 07A912 (2012). (Year: 2012).*
International Search Report issued on Oct. 30, 2017 in PCT/EP2017/067367 filed on Jul. 11, 2017.
Extended European Search Report issued on Jan. 31, 2017 in EP 16 17 8872 filed on Jul. 11, 2016.
Kanomata, T. et al., "Magnetovolume effect of $Co_2B$", Journal of Alloys and Compounds, vol. 259, 1997, pp. L1-L4, total 4 pages.
Fries, M. et al., "Magnetic, magnetocaloric and structural properties of manganese based monoborides doped with iron and cobalt—A candidate for thermomagnetic generators", Acta Materialia, vol. 113, 2016, pp. 213-220, total 8 pages.
Kuz 'Min, M. D. et al., "Towards high-performance permanent magnets without rare earths", Journal of Physics: Condensed Matter, vol. 26, No. 6, 2014, total 5 pages.

* cited by examiner

MAGNETOCALORIC REGENERATORS COMPRISING MATERIALS CONTAINING COBALT, MANGANESE, BORON AND CARBON

The present invention relates to magnetocaloric regenerators comprising materials containing cobalt, manganese and boron and optionally carbon, to processes for producing magnetocaloric regenerators, to devices comprising magnetocaloric regenerators and to the use of specific magnetocaloric materials in magnetocaloric regenerators.

The term “magnetocaloric material” denotes a material exhibiting a magnetocaloric effect, i.e. a temperature change caused by exposing said material to a changing external magnetic field. Application of an external magnetic field to a magnetocaloric material in the vicinity of the Curie temperature of said magnetocaloric material causes an alignment of the randomly oriented magnetic moments of the magnetocaloric material and thus a magnetic phase transition, which can also be described as a field-induced increase of the Curie temperature of the material. This magnetic phase transition implies a loss in magnetic entropy, and under adiabatic conditions leads to an increase of the sum of the lattice and electronic entropies of the magnetocaloric material compensating for the loss of magnetic entropy (so that its total entropy remains constant). Thus, applying the external magnetic field under adiabatic conditions results in an increase of the lattice vibrations, and a heating of the magnetocaloric material occurs.

In technical applications of the magnetocaloric effect, the generated heat is removed from the magnetocaloric material by heat transfer to a heat sink in the form of a heat transfer medium, e.g. water. Subsequent removing of the external magnetic field causes a decrease of the Curie temperature back to the normal value, and thus allows the magnetic moments to revert to a random arrangement. This causes an increase of the magnetic entropy and a reduction of the sum of the lattice and electronic entropies of the magnetocaloric material compensating for the increase of magnetic entropy. Thus, removing the external magnetic field under adiabatic conditions results in a decrease of the lattice vibrations, and cooling of the magnetocaloric material occurs. The described process cycle including magnetization and demagnetization is typically performed periodically in technical applications.

Several magnetocaloric materials which are known in the art are described e.g. by Karl G. Sandemann in Scripta Materialica 67 (2012) 566-571 and by K. A Gscheidner Jr. et al in Rep. Prog. Phys. 68 (2005) 1479-1539. However, there is a need for further magnetocaloric materials having properties which facilitate application of said materials in technical devices like cooling systems, heat exchangers, heat pumps, thermomagnetic power generators and thermomagnetic switches. More specifically there is a need for magnetocaloric materials which are not harmful towards health and environment, and which are obtainable from raw materials which are readily available, e.g. magnetocaloric materials which do not contain rare earth metals.

According to a first aspect of the present invention there is provided a material suitable for use in a magnetocaloric regenerator, said material having a composition according to formula (I)

$$Co_{2-x}Mn_xB_{1-y}C_y \quad \text{(I)}$$

wherein $0.5 \le x \le 1$ and $0 < y \le 0.5$.

It is understood that the case y=0 is not included in above-defined formula (I).

Surprisingly it has been found that materials having a composition according to formula (I) exhibit a magnetocaloric effect which is suitable for practical applications.

Preferred are materials having a composition according to formula (I), wherein $0.01 \le y \le 0.5$. preferably $0.02 \le y \le 0.2$.

Also preferred are materials having a composition according to formula (I), wherein $0.5 \le x \le 0.9$, preferably $0.55 \le x \le 0.8$.

Specifically preferred are material having a composition according to formula (I) wherein $0.02 \le y \le 0.2$. preferably $0.05 \le y \le 0.1$ and $0.55 \le x \le 0.8$, preferably $0.6 \le x \le 0.75$.

Exemplary materials having a composition according to formula (I) are selected from the group consisting of $Co_{1.4}Mn_{0.6}B_{0.95}C_{0.05}$, $Co_{1.4}Mn_{0.6}B_{0.9}C_{0.1}$, $Co_{1.3}Mn_{0.7}B_{0.95}C_{0.05}$, $Co_{1.3}Mn_{0.7}B_{0.9}C_{0.1}$, $Co_{1.25}Mn_{0.75}B_{0.95}C_{0.05}$, $Co_{1.25}Mn_{0.75}B_{0.9}C_{0.1}$.

In a second aspect, the present invention relates to a process for preparing a material according to formula (I) as defined above, said process comprising the steps of (a) providing a mixture of precursors comprising atoms of the elements cobalt, manganese, boron and carbon and (b) reacting the mixture provided in step (a) to obtain a solid reaction product, comprising (b-1) reacting the mixture provided in step (a) in the solid phase obtaining a solid reaction product and/or (b-2) transferring the mixture provided in step (a) or the solid reaction product obtained in step (b-1) into the liquid phase and reacting it in the liquid phase obtaining a liquid reaction product, and transferring the liquid reaction product into the solid phase obtaining a solid reaction product, and (c) optionally shaping of the solid reaction product obtained in step (b) to obtain a shaped solid reaction product, and (d) heat treatment of the solid reaction product obtained in step (b-1) or (b-2) or of the shaped solid reaction product obtained in step (c) to obtain a heat treated product, and (e) cooling the heat treated product obtained in step (d) to obtain a cooled product, and (f) optionally shaping of the cooled product obtained in step (e).

Preferably, said mixture of precursors provided in step (a) comprises one or more substances selected from the group consisting of elemental cobalt, elemental manganese, elemental boron, elemental carbon, borides of cobalt and borides of manganese, carbides of manganese, carbides of boron and carbonizable organic compounds.

Carbon precursors in the form of elemental carbon are preferred. Elemental carbon may be selected from the group consisting of graphite and amorphous carbon, e.g. carbon black. Carbon obtained from pyrolysis of carbonizable organic compounds is also a suitable precursor for providing carbon atoms. Carbonizable organic compounds are those which can be transferred into a product mainly consisting of carbon by pyrolysis (thermo-chemical cleavage of bonds under heat and non-oxidizing atmosphere, also referred to as charring). Alternatively, in step (a) carbonizable organic compounds are provided in the mixture of precursors, and pyrolyzed during step (b).

In the mixture of precursors to be provided in step (a) the stoichiometric ratio of the total amounts of atoms of the elements cobalt, manganese, boron and carbon is adjusted so that it corresponds to formula (I). In other words, in said mixture of precursors, the atoms of the elements cobalt, manganese, boron and carbon are present in stoichiometric amounts (with respect to formula (I)).

Step (a) is carried out by means of any suitable method. Preferably the precursors are powders, and/or the mixture of precursors is a powder mixture. If necessary, the mixture is ground in order to obtain a microcrystalline powder mixture. Mixing may comprise a period of ball milling which also provides suitable conditions for reacting the mixture of precursors in the solid state in subsequent step (b) (see below).

In cases where the precursors are powders, step (a) may further comprise compacting the mixture obtained by mixing said powders.

In step (b) the mixture provided in step (a) is reacted in the solid and/or liquid phase. In certain processes according to the invention, reacting is carried out in the solid phase (b-1) over the whole duration of step (b) so that a solid reaction product is obtained. In other processes according to the invention, reacting is carried out exclusively in the liquid phase (b-2) so that a liquid reaction product is obtained which is transferred into the solid phase obtaining a solid reaction product. Alternatively, reacting according to step (b) comprises one or more periods wherein reacting is carried out in the solid phase and one or more periods wherein reacting is carried out in the liquid phase. In preferred cases the reacting in step (b) consists of a first step (b-1) wherein reacting is carried out in the solid phase obtaining a solid reaction product, followed by a second step (b-2) wherein the solid reaction product obtained in step (b-1) is transferred into the liquid phase and reacting is carried out in the liquid phase obtaining a liquid reaction product which is transferred into the solid phase obtaining a solid reaction product. Preferably, step (b) is carried out under a protective gas atmosphere.

In step (b-1) reacting of the mixture in the solid phase preferably comprises ball-milling so that a solid reaction product in the form of a powder is obtained.

In step (b-2) transferring the mixture provided in step (a) or the solid reaction product obtained in step (b-1) into the liquid phase preferably comprises melting together the mixture of precursors, e.g. in an induction oven or by arc melting, preferably under a protecting gas (e.g. argon) atmosphere and/or in a closed vessel.

In a preferred process according to the present invention, in step (b-2) transferring the mixture provided in step (a) or transferring the solid reaction product obtained in step (b-1) into the liquid phase comprises arc-melting.

Step (b-2) also comprises transferring said liquid reaction product into the solid phase obtaining a solid reaction product. Transferring said liquid reaction product into the solid phase is carried out by means of any suitable method, e.g. by quenching, melt-spinning or atomization.

Quenching means cooling of the liquid reaction product obtained in step (b-2) in such manner that the temperature of said liquid reaction product decreases faster than it would decrease in contact with resting air.

The technique of melt-spinning is known in the art. In melt spinning the liquid reaction product obtained in step (b-2) is sprayed onto a cold rotating metal roll or drum. Typically the drum or roll is made from copper. Spraying is achieved by means of elevated pressure upstream of the spray nozzle or reduced pressure downstream of the spray nozzle. Typically the rotating drum or roll is cooled. The drum or roll preferably rotates at a surface speed of 10 to 40 m/s, especially from 20 to 30 m/s. On the drum or roll, the liquid composition is cooled at a rate of preferably from $10^2$ to $10^7$ K/s, more preferably at a rate of at least $10^4$ K/s, especially with a rate of from 0.5 to $2*10^6$ K/s. Preferably, melt spinning is carried out under a protecting gas (e.g. argon) atmosphere. Melt spinning enables a very homogeneous element distribution in the obtained reaction product which leads to an improved magnetocaloric effect.

Atomization corresponds to mechanical disintegration of the liquid reaction product obtained in step (b-2) into small droplets, e.g. by means of a water jet, an oil jet, a gas jet, centrifugal force or ultrasonic energy. The droplets solidify and are collected on a substrate, e.g. on the bottom of a cooling tower.

In a preferred process according to the present invention, in step (b-2) transferring the obtained liquid reaction product into the solid phase is carried out by quenching, melt-spinning or atomization.

Particularly preferably, in step (b-2) transferring the mixture provided in step (a) into the liquid phase comprises arc-melting, and transferring the obtained liquid reaction product into the solid phase comprises casting the obtained melt into an ingot. Optionally step (b-2) comprises up to 6 times remelting the obtained ingot and recasting the obtained melt into a recast ingot. By means of repeated remelting and recasting, the chemical composition and crystal structure of the ingot is homogenized.

Especially preferably, in step (b-2) transferring the mixture provided in step (a) into the liquid phase comprises arc-melting and transferring the obtained liquid reaction product into the solid phase comprises casting the obtained melt into an ingot, and step (b-2) further comprises up to 6 times remelting the obtained ingot and recasting the obtained melt into a recast ingot.

Step (c) is carried out by means of any suitable method. For instance, when the reaction product obtained in step (b) is a powder, in step (c) said powder is shaped by pressing, molding, rolling, extrusion (especially hot extrusion) or metal injection molding.

Step (d) is carried out by means of any suitable method. In step (d) the maximum temperature to which the solid reaction product obtained in step (b) or the shaped solid reaction product obtained in step (c) is exposed is below its melting temperature. Step (d) is performed in order to cure structural defects and to thermodynamically stabilize the reaction product obtained in step (b) and/or to strengthen and compact the shaped solid reaction product obtained in step (c) by fusing together the material grains.

Preferably, in step (d) the heat treatment comprises sintering the solid reaction product obtained in step (b) or the shaped solid reaction product obtained in step (c), preferably under a protective gas atmosphere.

Particularly preferably, in step (d) the heat treatment comprises holding the solid reaction product obtained in step (b) or the shaped solid reaction product obtained in step (c) at a temperature in the range of from 1000 K to 1300 K, over a duration of from 10 to 180 hours, preferably 10 to 170 hours.

Step (e) is carried out by means of any suitable method. In a preferred process according to the present invention, step (e) includes contacting the heat treated product obtained in step (d) with a liquid or gaseous medium, preferably at a quenching rate of 200 K/s or less, preferably 100 K/s or less, most preferably 25 K/s.

Particularly preferably, in step (e) quenching is carried out by means of contacting the heat treated product obtained in step (d) with water or aqueous liquids, for example cooled water or ice/water mixtures. For example, the heat treated product obtained in step (d) is allowed to fall into ice-cooled water in step (e). It is also possible that the heat treated product obtained in step (d) is quenched with sub-cooled gases such as liquid nitrogen or liquid argon in step (e).

Alternatively, in step (e) cooling down of the heat treated product obtained in step (d) may be carried out by retaining the heat treated product obtained in step (d) in the furnace wherein heat treating has been carried out, and turning said furnace off (known to the skilled person as "furnace cooling" or "oven cooling").

In a preferred process, in step (d) the heat treatment comprises holding the solid reaction product obtained in step (b) or the shaped solid reaction product obtained in step (c) at a temperature in the range of from 1000 K to 1300 K, over a duration of from 10 to 180 hours, preferably 10 to 170 hours, and in step (e) the heat treated product obtained in step (d) is cooled by quenching at a cooling rate of at least 10K/s, or by furnace cooling.

Step (f) is carried out by means of any suitable method. For instance, when the cooled product obtained in step (e) is in a shape not suitable for the desired technical application (e.g. in the form of a powder), in step (f) said cooled product obtained in step (e) is transferred into a shaped body by means of pressing, molding, rolling, extrusion (especially hot extrusion) or metal injection molding. Alternatively, the cooled product obtained in step (e) which is in the form of a powder or has been transferred into the form of a powder is mixed with a binding agent, and said mixture is transferred into a shaped body in step (f). Suitable binding agents are oligomeric and polymeric binding systems, but it is also possible to use low molecular weight organic compounds, for example sugars. The shaping of the mixture is achieved preferably by casting, injection molding or by extrusion. The binding agent either remains in the shaped body or is removed catalytically or thermally so that a porous body with monolith structure or a mesh structure is formed.

Preferred processes according to the present invention are those which exhibit two or more of the above-defined preferred features in combination.

According to a third aspect of the present invention there is provided a magnetocaloric regenerator comprising one or more materials having a composition according to general formula (A)

$$Co_{2-x}Mn_xB_{1-y}C_y \quad (A)$$

wherein $0.5 \leq x \leq 1$ and $0 \leq y \leq 0.5$.

Said materials having a composition according to general formula (A) include materials having a composition according to formula (I) as defined above in the context of the first aspect of the present invention and materials having a composition according to formula (II)

$$Co_{2-x}Mn_xB \quad (II)$$

wherein $0.5 \leq x \leq 1$.

Materials of having a composition according to general formula (A) have a tetragonal crystal structure.

Regarding specific and preferred characteristics of materials having a composition according to formula (I), reference is made to the disclosure provided above in the context of the first aspect of the present invention.

Regarding the materials having a composition according to formula (II), preferably, one or more of said materials have a composition according to formula (II)

$$Co_{2-x}Mn_xB \quad (II)$$

wherein $0.65 \leq x \leq 0.85$.

In certain cases it is preferred that one or more of said materials as defined above have a composition according to formula (II)

$$Co_{2-x}Mn_xB \quad (II)$$

wherein $0.5 < x < 1$ with the proviso that x is not one of 0.6, 0.7 and 0.8, further preferably wherein $0.8 < x < 1.0$, preferably $0.81 \leq x \leq 0.99$, further preferably $0.83 \leq x \leq 0.97$, particularly preferably $0.85 \leq x \leq 0.95$.

Exemplary materials having a composition according to formula (II) are selected from the group consisting of $Co_{1.45}Mn_{0.55}B$, $Co_{1.35}Mn_{0.65}B$, $Co_{1.25}Mn_{0.75}B$, $Co_{1.15}Mn_{0.85}B$, $Co_{1.1}Mn_{0.9}B$, $Co_{1.05}Mn_{0.95}B$.

A couple of materials having a composition according to formula (II)

$$Co_{2-x}Mn_xB \quad (II)$$

wherein $0.5 \leq x \leq 1$ have per se been disclosed in the prior art, see e.g.

(1) Hideoki Kadomatsu et al. (Journal of the Physical Society of Japan, Vol. 47, No. 4, October, 1979)

(2) M. C. Cadeville and A. J. P. Meyer: CR Acad. Sci. (France) 1962, 255, 3391.

Prior art documents (1) and (2) focus on the magnetic properties of said materials, while the magnetocaloric behavior is not described. There is no straightforward correlation between magnetic properties and magnetocaloric effect. For instance iron which is known to be ferromagnetic does not exhibit a significant magnetocaloric effect.

Related art (although not directed to materials having a composition according to general formula (A) as defined above) is also M. Fries et al.: "Magnetic, magnetocaloric and structural properties of manganese based monoborides doped with iron and cobalt—A candidate for thermomagnetic generators", Acta Materialia, vol. 113, 13 March 2016, pages 213-220 and

US 2014/202171 A1.

Surprisingly it has been found that materials having a composition according to formula (II) as defined above exhibit a magnetocaloric effect which is suitable for practical applications.

A regenerator (also referred to as regenerative heat exchanger) is a type of heat exchanger comprising at least one heat-storing material and fixtures to bring this heat-storing material in alternating manner in contact with a hot heat transfer fluid which is capable of transferring heat to the heat storing material and a cold heat transfer fluid which is capable of absorbing heat from the heat storing material. When the hot heat transfer fluid is brought into contact with the heat-storing material, heat from the hot heat transfer fluid is transferred to and intermittently stored in the heat-storing material. Then the heat transfer fluid which has transferred its heat to the heat exchanging material is displaced with the cold heat transfer fluid, which absorbs heat from the heat storing material.

In a magnetocaloric regenerator, the function of the heat storing material(s) is fulfilled by material(s) exhibiting a magnetocaloric effect (magnetocaloric materials). A magnetocaloric regenerator comprises means for repeatedly applying a magnetic field to said magnetocaloric material(s) and removing said magnetic field. In technical applications, a magnetocaloric regenerator is usually placed between a hot side heat exchanger and a cold side heat exchanger. A temperature gradient extending across the magnetocaloric regenerator is established between the cold side heat exchanger and the hot side heat exchanger, and heat is "pumped" from the cold-side heat-exchanger to the hot-side heat exchanger.

A magnetic regenerator cycle consists of four stages, starting from a state where no magnetic field is applied. First, applying a magnetic field causes heating of the magnetic regenerator by the magnetocaloric effect, thereby causing the cold heat transfer fluid within the magnetocaloric regenerator to heat up. Second, heat transfer fluid flows through the magnetocaloric regenerator in the direction from the cold-side heat exchanger to the hot-side heat exchanger. Heat is then released from the heat transfer fluid to the hot-side heat exchanger. Third, removing the magnetic field causes cooling of the magnetic regenerator by the magnetocaloric effect thereby causing the hot heat transfer fluid within the magnetocaloric regenerator to cool down. Last, the heat transfer fluid flows through the magnetocaloric regenerator in the direction from the hot-side heat exchanger to the cold-side heat exchanger. The cooled heat transfer fluid takes up heat from the cold-side heat exchanger, and the cold-side heat exchanger can be used to provide cooling to another body or system.

A magnetocaloric regenerator according to the present invention comprises one or more magnetocaloric materials, wherein at least one of the magnetocaloric materials is a material selected from the group consisting of materials having a composition according to formula (I)

$$Co_{2-x}Mn_xB_{1-y}C_y \quad \text{(I)}$$

wherein $0.5 \le x \le 1$ and $0 < y \le 0.5$ and materials having a composition according to formula (II)

$$Co_{2-x}Mn_xB \quad \text{(II)}$$

wherein $0.5 \le x \le 1$.

In said magnetocaloric regenerator, the material selected from the group consisting of materials having a composition according to formula (I) as defined above and materials having a composition according to formula (II) as defined above is present in any suitable shape, e.g. in the form of a plate, a sheet, a layer, a shaped body (preferably a shaped body exhibiting a plurality of passages, e.g. channels, extending through said shaped body allowing for the flow of heat transfer fluids), a porous shaped body (e.g. an open-cell foam or a porous body obtained by sintering together a plurality of particles of a material selected from the group consisting of materials having a composition according to formula (I) and materials having a composition according to formula (II) or gluing together a plurality of particles of a material selected from the group consisting of materials having a composition according to formula (I) and materials having a composition according to formula (II) by means of a binding agent) or a packed bed comprising a plurality of individual particles of a material selected from the group consisting of materials having a composition according to formula (I) and materials having a composition according to formula (II), wherein in said bed the particles are not connected to each other (i.e. the particles do not form a coherent body). For producing a shaped body as well as a packed bed described herein, in certain cases it is preferred that the particles of a material selected from the group consisting of materials having a composition according to formula (I) and materials having a composition according to formula (II) have spherical shape or a shape close to spherical shape.

It is known that the magnetocaloric effect of a material varies with temperature and has its maximum in the vicinity of the magnetic transition temperature (also referred to as the Curie temperature) of said material. Thus, in order to optimize the performance of the magnetocaloric regenerator it is desirable that at each position of the flow path of the heat transfer fluid across the magnetocaloric regenerator the Curie temperature coincides with the temperature determined by the temperature gradient for said position. In order to approach these ideal conditions, a magnetocaloric regenerator preferably comprises a cascade comprising three or more different materials, preferably 5 to 100 different materials having different Curie temperatures, wherein in said cascade said materials are arranged in succession by ascending or descending Curie temperature, i.e. the material having the highest Curie temperature is arranged at one end of the cascade, the material having the second highest Curie temperature follows and so on, and the material having the lowest Curie temperature is placed at the opposite end of the cascade. The end of the cascade where the material having the highest Curie temperature is located corresponds to the hot side of the magnetocaloric cascade, and the end of the cascade where the material having the lowest Curie temperature is located corresponds to the cold side of the magnetocaloric cascade.

In such a magnetocaloric cascade, cooling resp. heating of each material (with the exception of the first one) to a temperature near its Curie temperature is effected by the preceding material, and each material (with the exception of the last one) effects cooling resp. heating of the succeeding material to a temperature near its Curie temperature. In other words, the first magnetocaloric material effects cooling down resp. heating up the second magnetocaloric material to a temperature near the Curie temperature of the second magnetocaloric material, and so on with any further magnetocaloric material contained in the cascade. This way, the cooling effect achieved can be greatly increased in comparison with a magnetocaloric regenerator comprising a single magnetocaloric material.

Cascades comprising three or more different materials, preferably 5 to 100 different materials which exhibit a magnetocaloric effect at different temperatures, wherein in said cascade said materials are arranged in succession by ascending or descending Curie temperature are described in e.g. in US 2014/0202171 Al and U.S. Pat. No. 8,763,407 B2.

The Curie temperature Tc is determined from differential scanning calorimetry (DSC) zero field measurements as the temperature in the region of the magnetic phase transition at which the specific heat capacity is at its maximum value, or from records of the magnetization as function of temperature under an applied magnetic field, as the temperature where dM/dT is at its maximum value.

In a magnetocaloric regenerator according to the present invention, at least one of the materials of the above-described cascade is a material having a composition according to general formula (A)

$$Co_{2-x}Mn_xB_{1-y}C_y \quad \text{(A)}$$

wherein $0.5 \le x \le 1$ and $0 \le y \le 0.5$.

More specifically, in a magnetocaloric regenerator according to the present invention, at least one of the materials of the above-described cascade is a material selected from the group consisting of materials having a composition according to formula (I)

$$Co_{2-x}Mn_xB_{1-y}C_y \quad (I)$$

wherein $0.5 \leq x \leq 1$ and $0 < y \leq 0.5$ and materials having a composition according to formula (II)

$$Co_{2-x}Mn_xB \quad (II)$$

wherein $0.5 \leq x \leq 1$.

Preferably, a magnetocaloric regenerator according to the present invention comprises a cascade comprising three or more different materials each having a composition according to general formula (A), wherein in said cascade said materials are arranged in succession by ascending or descending Curie temperature. Preferably a magnetocaloric regenerator according to the present invention comprises a cascade comprising 5 to 100 different materials each having a composition according to general formula (A) as defined above, wherein in said cascade said materials are arranged in succession by ascending or descending Curie temperature. For instance, a magnetocaloric regenerator according to the present invention comprises a cascade comprising three or more different materials each having a composition according to formula (I) as defined above, preferably 5 to 100 different materials each having a composition according to formula (I) as defined above, wherein in said cascade said materials are arranged in succession by ascending or descending Curie temperature. For instance, a magnetocaloric regenerator according to the present invention comprises a cascade comprising three or more different materials each having a composition according to formula (II) as defined above, preferably a cascade comprising 5 to 100 different materials each having a composition according to formula (II), wherein in said cascade said materials are arranged in succession by ascending or descending Curie temperature.

The number of different magnetocaloric materials and their Curie temperatures are selected depending on the temperature span to be covered in the desired application. Preferably, the difference in the Curie temperatures between the material with the highest Curie temperature and the material with the lowest Curie temperature corresponds to said temperature span.

Preferably, said materials having a composition according to general formula (A) have Curie temperatures in the range of from 160 K to 420 K, preferably 160 K to 390 K, more preferably of from 220 K to 330 K. Preferably, said materials having a composition according to formula (I) have Curie temperatures in the range of from 160 K to 420 K, preferably of from 160 K to 390 K, more preferably of from 220 K to 330 K. Preferably, said materials having a composition according to formula (II) have Curie temperatures in the range of from 160 K to 420 K, preferably of from 220 K to 330 K.

Preferably, in said cascade the temperature difference between two succeeding materials having a composition according to general formula (A) is in each case in the range of from 0.5 K to 6 K, preferably 0.5 to 4 K and even more preferably 0.5 to 2.5 K. Preferably, in said cascade the temperature difference between two succeeding materials having a composition according to formula (I) is in each case in the range of from 0.5 K to 6 K, preferably 0.5 to 4 K and even more preferably 0.5 to 2.5 K. Preferably, in said cascade the temperature difference between two succeeding materials having a composition according to formula (II) is in each case in the range of from 0.5 K to 6 K, preferably 0.5 to 4 K and even more preferably 0.5 to 2.5 K.

Within said cascade, the plurality of succeeding materials may be present in any suitable shape, e.g. in the form of a plurality of plates, sheets, layers, shaped bodies (preferably shaped bodies exhibiting a plurality of passages, e.g. channels, extending through said shaped body allowing for the flow of heat transfer fluids), porous shaped bodies (e.g. open-cell foams or porous bodies obtained by sintering together a plurality of particles of a material selected from the group consisting of materials having a composition according to formula (I) and materials having a composition according to formula (II), or gluing together a plurality of particles of a material selected from the group consisting of materials having a composition according to formula (I) and materials having a composition according to formula (II) by means of a binding agent), or packed beds each comprising a plurality of individual particles of a material selected from the group consisting of materials having a composition according to formula (I) and materials having a composition according to formula (II), wherein in said beds the particles are not connected to each other. For producing the shaped bodies as well as the packed beds described herein, in certain cases it is preferred that the particles of materials selected from the group consisting of materials having a composition according to formula (I) and materials having a composition according to formula (II) have spherical shape or a shape close to spherical shape.

In said cascade, said magnetocaloric materials having different Curie temperatures are preferably separated from each other by a distance of 0.05 mm to 3 mm, more preferably 0.1 mm to 0.5 mm, thereby preventing cross contamination of the individual magnetocaloric materials by constituents of other magnetocaloric materials. The intermediate space between the different materials is preferably filled by one or more thermally insulating materials to an extent of at least 90%, preferably completely.

The thermally insulating materials may be selected from any suitable materials. Preferred thermally insulating materials exhibit a low electrical conductivity as well as a low thermal conductivity, thereby preventing the occurrence of eddy currents and heat losses owing to thermal conduction from the hot side to the cold side. Preferably said thermally insulating materials combine high mechanical strength with good electrical and thermal insulating action. High mechanical strength of the thermally insulating materials allows reduction or absorption of the mechanical stresses in the magnetocaloric materials, which result from the cycle of introduction into and removal from the magnetic field. In the course of introduction into the magnetic field and removal from the magnetic field, the forces acting on the magnetocaloric materials may be considerable owing to the strong magnets. Examples of suitable thermally insulating materials are engineering plastics, ceramics, inorganic oxides, glasses and combinations thereof.

Preferred magnetocaloric regenerators according to the present invention are those which exhibit two or more of the above-defined preferred features in combination.

In a fourth aspect, the present invention relates to the use of a material having a composition according to general formula (A)

$$Co_{2-x}Mn_xB_{1-y}C_y \quad (A)$$

wherein $0.5 \leq x \leq 1$ and $0 \leq y \leq 0.5$.

in a magnetocaloric regenerator.

Regarding specific and preferred characteristics of said materials and said magnetocaloric regenerators, reference is made to the disclosure provided above in the context of the first and third aspect of the present invention.

Said materials having a composition according to general formula (A) include materials having a composition according to formula (I) as defined above in the context of the first aspect of the present invention and materials having a composition according to formula (II)

$$Co_{2-x}Mn_xB \quad (II)$$

wherein $0.5 \leq x \leq 1$.

Preferably, said material selected from the group consisting of materials having a composition according to formula (I) and materials having a composition according to formula (II) is one of the preferred ones described in the context of the first resp. the third aspect of the present invention.

In a fifth aspect, the present invention relates to a device selected from the group consisting of refrigeration systems, climate control units, air conditioning devices, thermomagnetic power generators, heat exchangers, heat pumps, magnetic actuators and magnetic switches, wherein said device comprises a magnetocaloric regenerator according to the third aspect of the present invention.

Refrigeration systems, climate control units, air conditioning devices, heat exchangers, heat pumps, magnetic actuators and magnetic switches are generally known in the art.

A thermomagnetic power generator is a device which converts heat to electricity by means of the magnetocaloric effect. By heating and cooling a magnetocaloric material, the magnetization of the material changes. The changing magnetization can be converted to electricity by exposing said changing magnetization to a coil, thereby inducting an electrical current in said coil.

Regarding specific and preferred characteristics of said magnetocaloric regenerators, reference is made to the disclosure provided above in the context of the third aspect of the present invention. Preferably, said magnetocaloric regenerator is one of the preferred magnetocaloric regenerators described in the context of the third aspect of the present invention.

In a sixth aspect, the present invention relates to the use of a magnetocaloric regenerator according to the third aspect of the present invention in a device selected from the group consisting of refrigeration systems, climate control units, air conditioning devices, thermomagnetic power generators, heat pumps, heat exchangers magnetic actuators and magnetic switches.

Regarding specific and preferred characteristics of said magnetocaloric regenerators, reference is made to the disclosure provided above in the context of the third aspect of the present invention. Preferably, said magnetocaloric regenerator is one of the preferred magnetocaloric regenerators described in the context of the third aspect of the present invention.

In a seventh aspect, the present invention relates to a process for producing a magnetocaloric regenerator according the above described third aspect of the present invention. Said process comprises preparing or providing one or more materials having a composition according to general formula (A) as defined above $$Co_{2-x}Mn_xB_{1-y}C_y \quad (A)$$

wherein $0.5 \leq x \leq 1$ and $0 \leq y \leq 0.5$.

Accordingly, a process according to the seventh aspect of the present invention comprises preparing or providing one or more materials from the group consisting of materials having a composition according to formula (I)

$$Co_{2-x}Mn_xB_{1-y}C_y \quad (I)$$

wherein $0.5 \leq x \leq 1$ and $0 < y \leq 0.5$ and materials having a composition according to formula (II)

$$Co_{2-x}Mn_xB \quad (II)$$

wherein $0.5 \leq x \leq 1$.

In a preferred process according to the seventh aspect of the present invention, a material having a composition according to formula (II) is prepared, wherein preparing a material having a composition according to formula (II) comprises the steps of (a) providing a mixture of precursors comprising atoms of the elements cobalt, manganese and boron and (b) reacting the mixture provided in step (a) to obtain a solid reaction product, comprising (b-1) reacting the mixture provided in step (a) in the solid phase obtaining a solid reaction product and/or (b-2) transferring the mixture provided in step (a) or the solid reaction product obtained in step (b-1) into the liquid phase and reacting it in the liquid phase obtaining a liquid reaction product, and transferring the liquid reaction product into the solid phase obtaining a solid reaction product, and (c) optionally shaping of the solid reaction product obtained in step (b) to obtain a shaped solid reaction product, and (d) heat treatment of the solid reaction product obtained in step (b-1) or (b-2) or of the shaped solid reaction product obtained in step (c) to obtain a heat treated product, and (e) cooling the heat treated product obtained in step (d) to obtain a cooled product, and (f) optionally shaping of the cooled product obtained in step (e).

Preferably, said mixture of precursors provided in step (a) comprises one or more substances selected from the group consisting of elemental cobalt, elemental manganese, elemental boron, borides of cobalt and borides of manganese.

In the mixture of precursors to be provided in step (a) the stoichiometric ratio of the total amounts of atoms of the elements cobalt, manganese and boron is adjusted so that it corresponds to formula (II). In other words, in said mixture of precursors, the atoms of the elements cobalt, manganese and boron are present in stoichiometric amounts (with respect to formula (II)).

Step (a) is carried out by means of any suitable method. Preferably the precursors are powders, and/or the mixture of precursors is a powder mixture. If necessary, the mixture is ground in order to obtain a microcrystalline powder mixture. Mixing may comprise a period of ball milling which also provides suitable conditions for reacting the mixture of precursors in the solid state in subsequent step (b) (see below).

In cases where the precursors are powders, step (a) may further comprise compacting the mixture obtained by mixing said powders.

In step (b) the mixture provided in step (a) is reacted in the solid and/or liquid phase. In certain processes according to the invention, reacting is carried out in the solid phase (b-1) over the whole duration of step (b) so that a solid reaction product is obtained. In other processes according to the invention, reacting is carried out exclusively in the liquid phase (b-2) so that a liquid reaction product is obtained which is transferred into the solid phase obtaining a solid reaction product. Alternatively, reacting according to step (b) comprises one or more periods wherein reacting is carried out in the solid phase and one or more periods wherein reacting is carried out in the liquid phase. In preferred cases the reacting in step (b) consists of a first step (b-1) wherein reacting is carried out in the solid phase obtaining a solid reaction product, followed by a second step (b-2) wherein the solid reaction product obtained in step (b-1) is transferred into the liquid phase and reacting is carried out in the liquid phase obtaining a liquid reaction product which is transferred into the solid phase obtaining a solid reaction product. Preferably, step (b) is carried out under a protective gas atmosphere.

In step (b-1) reacting of the mixture in the solid phase preferably comprises ball-milling so that a solid reaction product in the form of a powder is obtained.

In step (b-2) transferring the mixture provided in step (a) or the solid reaction product obtained in step (b-1) into the liquid phase preferably comprises melting together the mixture of precursors, e.g. in an induction oven or by arc melting, preferably under a protecting gas (e.g. argon) atmosphere and/or in a closed vessel.

In a preferred process according to the present invention, in step (b-2) transferring the mixture provided in step (a) or transferring the solid reaction product obtained in step (b-1) into the liquid phase comprises arc-melting.

Step (b-2) also comprises transferring said liquid reaction product into the solid phase obtaining a solid reaction product. Transferring said liquid reaction product into the solid phase is carried out by means of any suitable method, e.g. by quenching, melt-spinning or atomization.

Quenching means cooling of the liquid reaction product obtained in step (b-2) in such manner that the temperature of said liquid reaction product decreases faster than it would decrease in contact with resting air.

The technique of melt-spinning is known in the art. In melt spinning the liquid reaction product obtained in step (b-2) is sprayed onto a cold rotating metal roll or drum. Typically the drum or roll is made from copper. Spraying is achieved by means of elevated pressure upstream of the spray nozzle or reduced pressure downstream of the spray nozzle. Typically the rotating drum or roll is cooled. The drum or roll preferably rotates at a surface speed of 10 to 40 m/s, especially from 20 to 30 m/s. On the drum or roll, the liquid composition is cooled at a rate of preferably from $10^2$ to $10^7$ K/s, more preferably at a rate of at least $10^4$ K/s, especially with a rate of from 0.5 to $2*10^6$ K/s. Preferably, melt spinning is carried out under a protecting gas (e.g. argon) atmosphere. Melt spinning enables a very homogeneous element distribution in the obtained reaction product which leads to an improved magnetocaloric effect.

Atomization corresponds to mechanical disintegration of the liquid reaction product obtained in step (b-2) into small droplets, e.g. by means of a water jet, an oil jet, a gas jet, centrifugal force or ultrasonic energy. The droplets solidify and are collected on a substrate, e.g. on the bottom of a cooling tower.

In a preferred process according to the present invention, in step (b-2) transferring the obtained liquid reaction product into the solid phase is carried out by quenching, melt-spinning or atomization.

Particularly preferably, in step (b-2) transferring the mixture provided in step (a) into the liquid phase comprises arc-melting, and transferring the obtained liquid reaction product into the solid phase comprises casting the obtained melt into an ingot. Optionally step (b-2) comprises up to 6 times remelting the obtained ingot and recasting the obtained melt into a recast ingot. By means of repeated remelting and recasting, the chemical composition and crystal structure of the ingot is homogenized.

Especially preferably, in step (b-2) transferring the mixture provided in step (a) into the liquid phase comprises arc-melting and transferring the obtained liquid reaction product into the solid phase comprises casting the obtained melt into an ingot, and step (b-2) further comprises up to 6 times remelting the obtained ingot and recasting the obtained melt into a recast ingot.

Step (c) is carried out by means of any suitable method. For instance, when the reaction product obtained in step (b) is a powder, in step (c) said powder is shaped by pressing, molding, rolling, extrusion (especially hot extrusion) or metal injection molding.

Step (d) is carried out by means of any suitable method. In step (d) the maximum temperature to which the solid reaction product obtained in step (b) or the shaped solid reaction product obtained in step (c) is exposed is below its melting temperature. Step (d) is performed in order to cure structural defects and to thermodynamically stabilize the reaction product obtained in step (b) and/or to strengthen and compact the shaped solid reaction product obtained in step (c) by fusing together the material grains.

Preferably, in step (d) the heat treatment comprises sintering the solid reaction product obtained in step (b) or the shaped solid reaction product obtained in step (c), preferably under a protective gas atmosphere.

Particularly preferably, in step (d) the heat treatment comprises holding the solid reaction product obtained in step (b) or the shaped solid reaction product obtained in step (c) at a temperature in the range of from 1000 K to 1300 K, over a duration of from 10 to 180 hours, preferably 10 to 170 hours.

Step (e) is carried out by means of any suitable method. In a preferred process according to the present invention, step (e) includes contacting the heat treated product obtained in step (d) with a liquid or gaseous medium, preferably at a quenching rate of 200 K/s or less, preferably 100 K/s or less, most preferably 25 K/s.

Particularly preferably, in step (e) quenching is carried out by means of contacting the heat treated product obtained in step (d) with water or aqueous liquids, for example cooled water or ice/water mixtures. For example, the heat treated product obtained in step (d) is allowed to fall into ice-cooled water in step (e). It is also possible that the heat treated product obtained in step (d) is quenched with sub-cooled gases such as liquid nitrogen or liquid argon in step (e).

Alternatively, in step (e) cooling down of the heat treated product obtained in step (d) may be carried out by retaining the heat treated product obtained in step (d) in the furnace wherein heat treating has been carried out, and turning said furnace off (known to the skilled person as "furnace cooling" or "oven cooling").

In a preferred process, in step (d) the heat treatment comprises holding the solid reaction product obtained in step (b) or the shaped solid reaction product obtained in step (c) at a temperature in the range of from 1000 K to 1300 K, over a duration of from 10 to 180 hours, preferably 10 to 170 hours, and in step (e) the heat treated product obtained in step (d) is cooled by quenching at a cooling rate of at least 10K/s, or by furnace cooling.

Step (f) is carried out by means of any suitable method. For instance, when the cooled product obtained in step (e) is in a shape not suitable for the desired technical application (e.g. in the form of a powder), in step (f) said cooled product obtained in step (e) is transferred into a shaped body by means of pressing, molding, rolling, extrusion (especially hot extrusion) or metal injection molding. Alternatively, the cooled product obtained in step (e) which is in the form of a powder or has been transferred into the form of a powder is mixed with a binding agent, and said mixture is transferred into a shaped body in step (f). Suitable binding agents are oligomeric and polymeric binding systems, but it is also possible to use low molecular weight organic compounds, for example sugars. The shaping of the mixture is achieved preferably by casting, injection molding or by extrusion. The binding agent either remains in the shaped body or is removed catalytically or thermally so that a porous body with monolith structure is or a mesh structure formed.

Preferred processes according to the present invention are those which exhibit two or more of the above-defined preferred features in combination.

In another preferred process according to the seventh aspect of the present invention, a material having a composition according to formula (I) as described in the first aspect of the present invention (see above) is prepared by a process according to the second aspect of the present invention (see above). Regarding specific and preferred features of said process, reference is made to the disclosure provided above in the context of the second aspect of the present invention.

In an eighth aspect, the present invention relates to novel materials having a composition falling under to formula (II) as defined above. Said novel materials have a composition according to formula (II)

$$Co_{2-x}Mn_xB \quad \text{(II)}$$

wherein $0.5<x<1$ with the proviso that x is not one of 0.6, 0.7 and 0.8.

Further preferably, in formula (II) as defined above $0.8<x<1.0$, preferably $0.81\leq x\leq 0.99$, further preferably $0.83\leq x\leq 0.97$, particularly preferably $0.85\leq x\leq 0.95$.

Exemplary materials of formula (II) are selected from the group consisting of $Co_{1.45}Mn_{0.55}B$, $Co_{1.35}Mn_{0.65}B$, $Co_{1.25}Mn_{0.75}B$, $Co_{1.15}Mn_{0.85}B$, $Co_{1.1}Mn_{0.9}B$, $Co_{1.05}Mn_{0.95}B$.

In a ninth aspect, the present invention relates to a process for preparing a material according to formula (II) as defined above, said process comprising the steps of (b) providing a mixture of precursors comprising atoms of the elements cobalt, manganese and boron and (b) reacting the mixture provided in step (a) to obtain a solid reaction product, comprising (b-1) reacting the mixture provided in step (a) in the solid phase obtaining a solid reaction product and/or (b-2) transferring the mixture provided in step (a) or the solid reaction product obtained in step (b-1) into the liquid phase and reacting it in the liquid phase obtaining a liquid reaction product, and transferring the liquid reaction product into the solid phase obtaining a solid reaction product, and (c) optionally shaping of the solid reaction product obtained in step (b) to obtain a shaped solid reaction product, and (d) heat treatment of the solid reaction product obtained in step (b-1) or (b-2) or of the shaped solid reaction product obtained in step (c) to obtain a heat treated product, and (e) cooling the heat treated product obtained in step (d) to obtain a cooled product, and (f) optionally shaping of the cooled product obtained in step (e).

Regarding specific and preferred features of the above-defined process, reference is made to the disclosure provided above in the context of the seventh aspect of the present invention.

The present invention is now further illustrated by the following examples.

EXAMPLES

Materials Having a Composition According to Formula (II)

For each material of formula (II) to be produced, in step (a) a mixture of precursors (total mass about 0.3 g) consisting of stoichiometric amounts of cobalt powder (99.5%, 325 mesh, purified by heating under $H_2$ flow at 773 K for 5 hours), manganese powder (99.95%, 325 mesh), and crystalline boron powder (98%, 325 mesh)

(all obtained from Alfa Aesar) was provided.

The powders were mixed mechanically inside glass vials and the obtained mixtures were compacted into pellets.

In step (b-2), the compacted mixtures of precursors provided in step (a) were transferred into the liquid phase by arc melting and the obtained liquid reaction products were transferred into the solid phase by casting the obtained melt into an ingot. Each ingot was turned over and remelted up to 6 times in order to increase homogeneity of the chemical composition and crystal structure of the as-cast samples.

The ingots obtained in step (b-2) were placed in silica tubes having 10 mm inner diameter, and the tubes were sealed under vacuum ($<10^{-2}$ mbar). In step (d) the sealed tubes containing the ingots were heated to 1273 K in 10 hours, held at this temperature for 96 hours, and in step (e) the tubes containing the samples were cooled to room temperature with the furnace turned off (furnace-cooling).

The preparation and handling of the samples were performed in an atmosphere of argon inside a glove-box (content of $O_2<1$ ppm).

All synthesized samples were characterized by powder X-ray diffraction using a PANalytical X'Pert Pro diffractometer equipped with X'Celerator detector (MoKα radiation, $\lambda=0.71073$ Å). Phase identification was performed by means of WinXPOW and HighScore Plus software. Profile deconvolution, indexing and refinement of unit cell parameters were performed by WinCSD.

Magnetic measurements were performed on ground samples using a MPMS XL SQUID magnetometer (Quantum Design). Magnetization was measured in an applied magnetic field of 0.01 T in a field-cooled (FC) mode over a temperature range of from 3 K to 400 K. The Curie temperature was determined from these measurements.

To calculate the magnetocaloric effect (MCE), magnetization (M) as a function of temperature (T) curves were recorded in various magnetic fields (H) in the range of 0.1 T to 2 T using Quantum Design magnetometers SQUID MPMS-XL and VersaLab VSM. The measured M(T) curves were converted to M(H) curves by interpolation. The entropy change, AS, was then derived indirectly using the Maxwell equation.

$$\Delta S(T, \Delta H) = \int_0^{H_{max}} \left(\frac{\partial M}{\partial T}\right)_H dH$$

Table 1 compiles crystallographic data and Curie temperatures of all prepared samples showing the unit cell parameters with estimated standard deviation (e.s.d.) values in parentheses.

TABLE 1

| x (Mn) | a [Å] | c [Å] | V [Å3] | Tc [K] |
|---|---|---|---|---|
| 0.50 | not determined | not determined | not determined | 386 |
| 0.55 | 5.0016(5) | 4.1723(5) | 104.37(3) | 365 |
| 0.60 | 5.0033(6) | 4.1783(6) | 104.59(4) | 349 |
| 0.65 | 5.0084(4) | 4.1739(4) | 104.70(3) | 325 |
| 0.75 | 5.0127(3) | 4.1730(3) | 104.85(2) | 288 |
| 0.80 | 5.0173(9) | 4.170(1) | 104.97(6) | not determined |
| 0.85 | 5.0187(6) | 4.1692(5) | 105.01(4) | 228 |
| 0.90 | 5.0227(5) | 4.1707(4) | 105.22(3) | 201 |
| 0.95 | 5.022(1) | 4.1652(7) | 105.06(6) | 169 |
| 1.00 | 5.0256(8) | 4.1678(6) | 105.26(5) | 162 |

FIG. 1 shows the powder X-ray diffraction (XRD) patterns of the materials listed in table 1. With increasing content of manganese the positions of diffraction lines observed in the X-ray pattern gradually changes. No additional reflections are observed.

Figure 1:
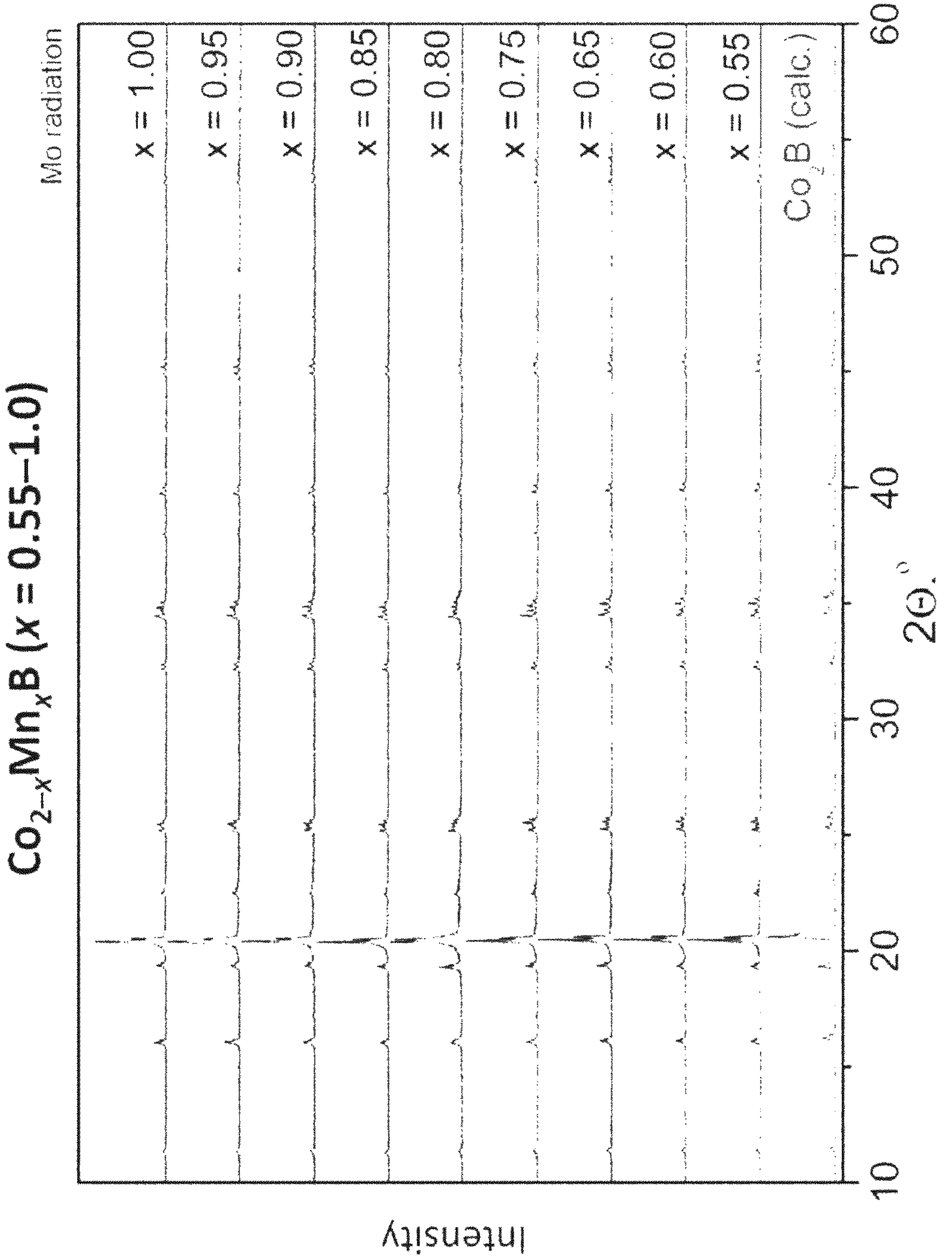
Figure 2:
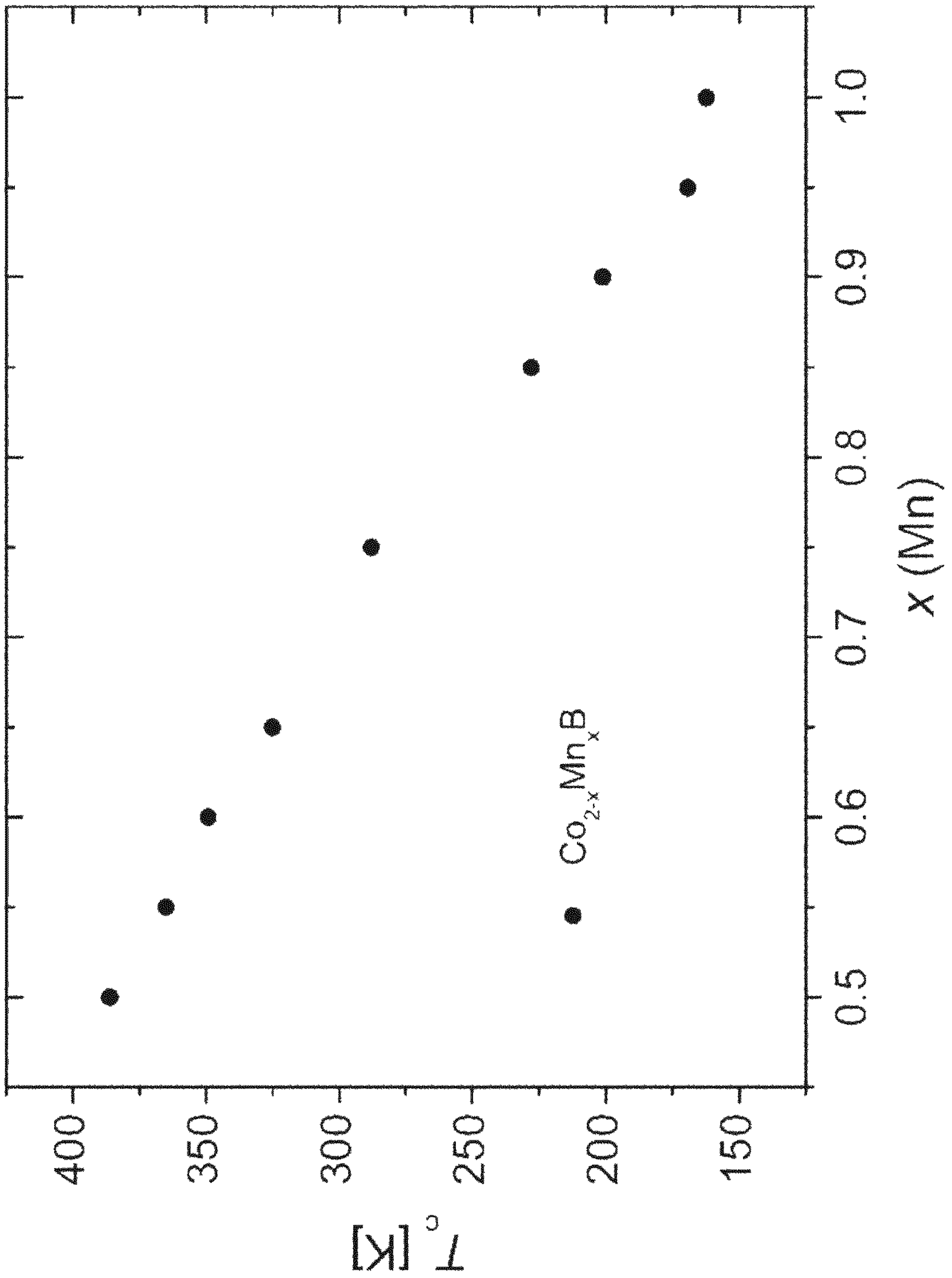
FIG. 2 shows that the Curie temperature decreases continuously with increasing content of manganese.

Comparison of Materials Having a Composition According to General Formula (A) with and without Carbon For each material to be produced (see table 3 below), in step (a) a mixture of precursors (total mass about 0.3 g) consisting of stoichiometric amounts of cobalt powder (99.5%, 325 mesh, purified by heating under $H_2$ flow at 773 K for 5 hours), manganese powder (99.95%, 325 mesh), and crystalline boron powder (98%, 325 mesh)

acetylene black was provided.

The powders were mixed mechanically inside glass vials and the obtained mixtures were compacted into pellets.

In step (b-2), the compacted mixtures of precursors provided in step (a) were transferred into the liquid phase by arc melting and the obtained liquid reaction products were transferred into the solid phase by casting the obtained melt into an ingot. Each ingot was turned over and remelted up to 6 times in order to increase homogeneity of the chemical composition and crystal structure of the as-cast samples.

The ingots obtained in step (b-2) were placed in silica tubes having 10 mm inner diameter, and the tubes were sealed under vacuum (<$10^{-2}$ mbar). In step (d) the sealed tubes containing the ingots were heated to 1273 K in 10 hours, held at this temperature for 168 hours, and in step (e) the tubes containing the samples were cooled to room temperature with the furnace turned off (furnace-cooling).

The preparation and handling of the samples were performed in an atmosphere of argon inside a glove-box (content of $O_2$<1 ppm).

All synthesized samples were characterized by powder X-ray diffraction using a PANalytical X'Pert Pro diffractometer equipped with X'Celerator detector (CuKα radiation, λ=1.54178 Å). Phase identification, profile deconvolution, indexing and refinement of unit cell parameters were performed by WinCSD or Highscore Plus.

Magnetic measurements were performed on ground samples using a MPMS XL SQUID magnetometer (Quantum Design). Magnetization was measured in an applied magnetic field of 0.01 T in a field-cooled (FC) mode over a temperature range of from 3 K to 400 K. The Curie temperature (see table 3) was determined from these measurements.

Figure 5:
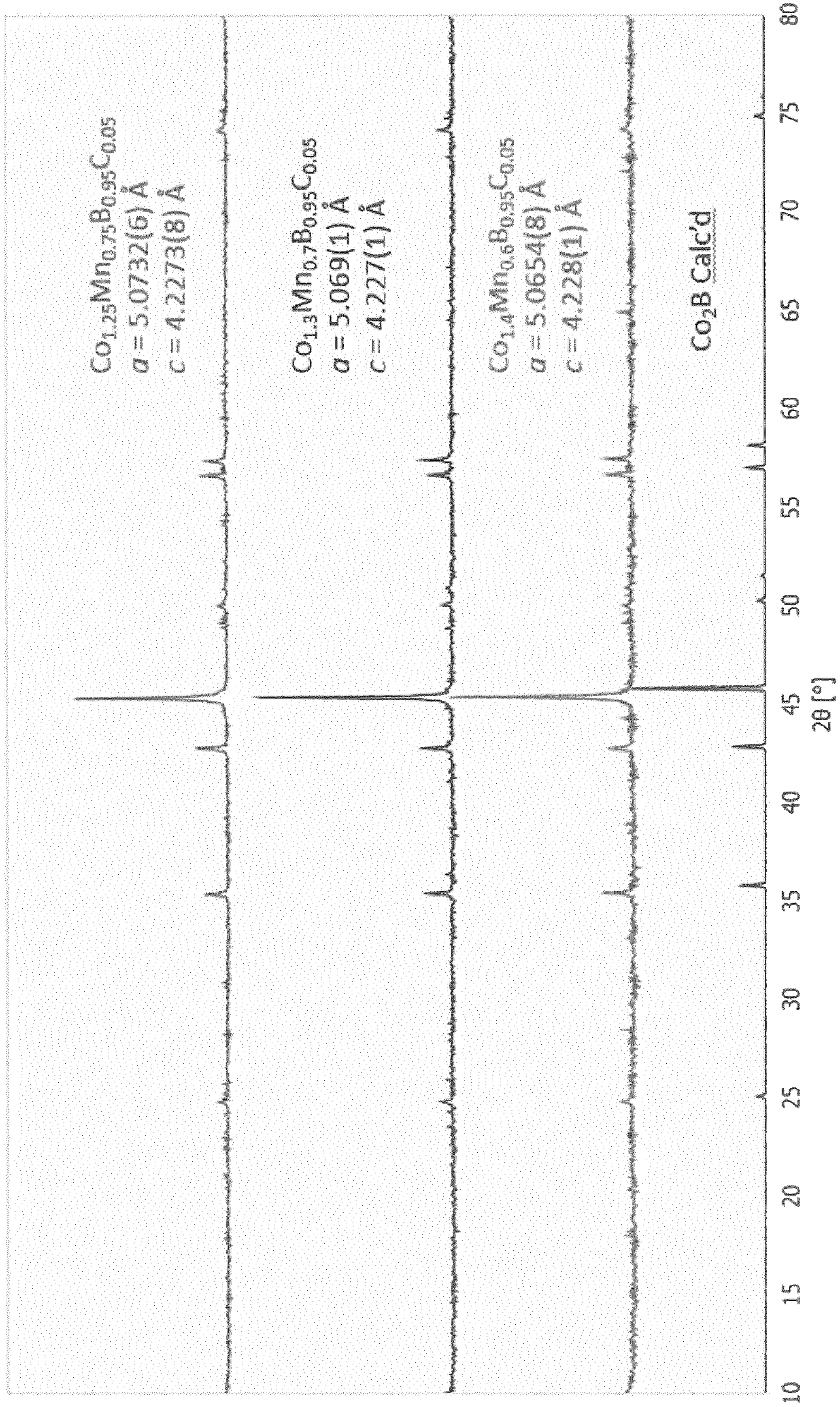

FIG. 5 shows the powder X-ray diffraction (XRD) patterns of materials having a composition $Co_{2-x}Mn_xB_{0.5}C_{0.5}$ with x=0.6; 0.7 and 0.75. For comparison, the powder X-ray diffraction (XRD) pattern of $Co_2B$ is displayed, too. As in FIG. 1, with increasing content of manganese the X-ray pattern gradually changes. The XRD patterns do not exhibit any features related to the presence of carbon. Without wishing to be bound by any theory, it is presently assumed that the presence of carbon virtually does not change the crystal structure. It is noted that—as known by the skilled person—the application of CuKα radiation instead of MoKα radiation (see above and FIG. 1) causes a shift in the diffraction angles to higher values, as can be recognized by comparison of FIG. 5 and FIG. 1. For instance the peak at about 2θ=22° in FIG. 1 is shifted to about 2θ=46° in FIG. 5.

Table 2 compiles crystallographic data of materials having a composition $Co_{2-x}Mn_xB_{0.5}C_{0.5}$ with x=0.6; 0.7 and 0.75, showing the unit cell parameters with estimated standard deviation (e.s.d.) values in parentheses. In table 2 as well as in table 1, the e.s.d. values are in each case associated with the last digit. For example 4.2273(8) shall mean that the value could vary between 4.2265 and 4.2281.

TABLE 2

| x (Mn) | a [Å] | c [Å] |
|---|---|---|
| 0.60 | 5.07326(6) | 4.2273(8) |
| 0.7 | 5.069(1) | 4.227(1) |
| 0.75 | 5.0645(8) | 4.228(1) |

Figure 3:
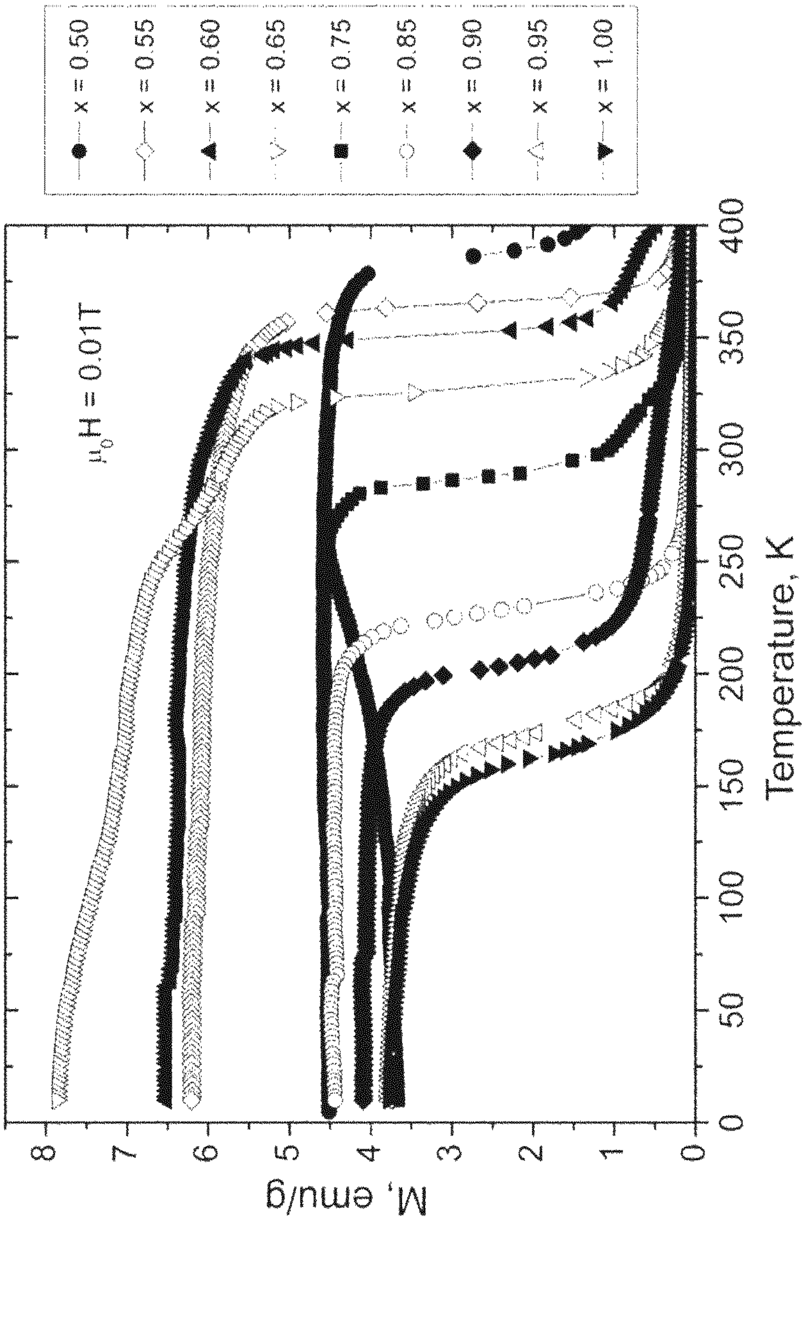
FIG. 3 shows the specific magnetization (M) as a function of temperature (T) at a magnetic field strength of 0.01 T for the materials listed in table 1.
Figure 4A:
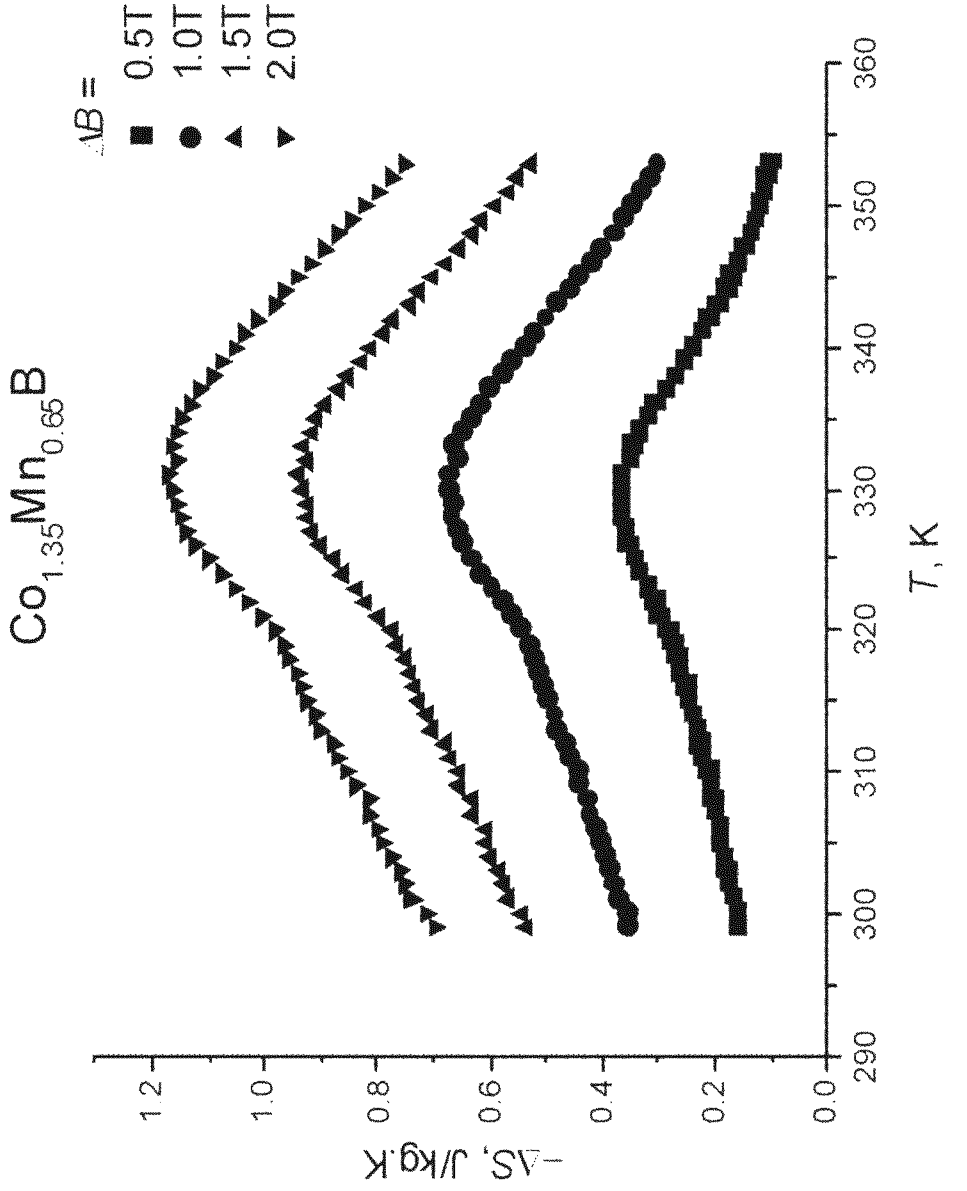
FIGS. 4A and 4B show the magnetic entropy change ΔSm at a field change of 0.5 T, 1 T, 1.5 T and 2 T for $Co_{1.35}Mn_{0.65}B$ and $Co_{1.25}Mn_{0.75}B$, resp.
Figure 4B:
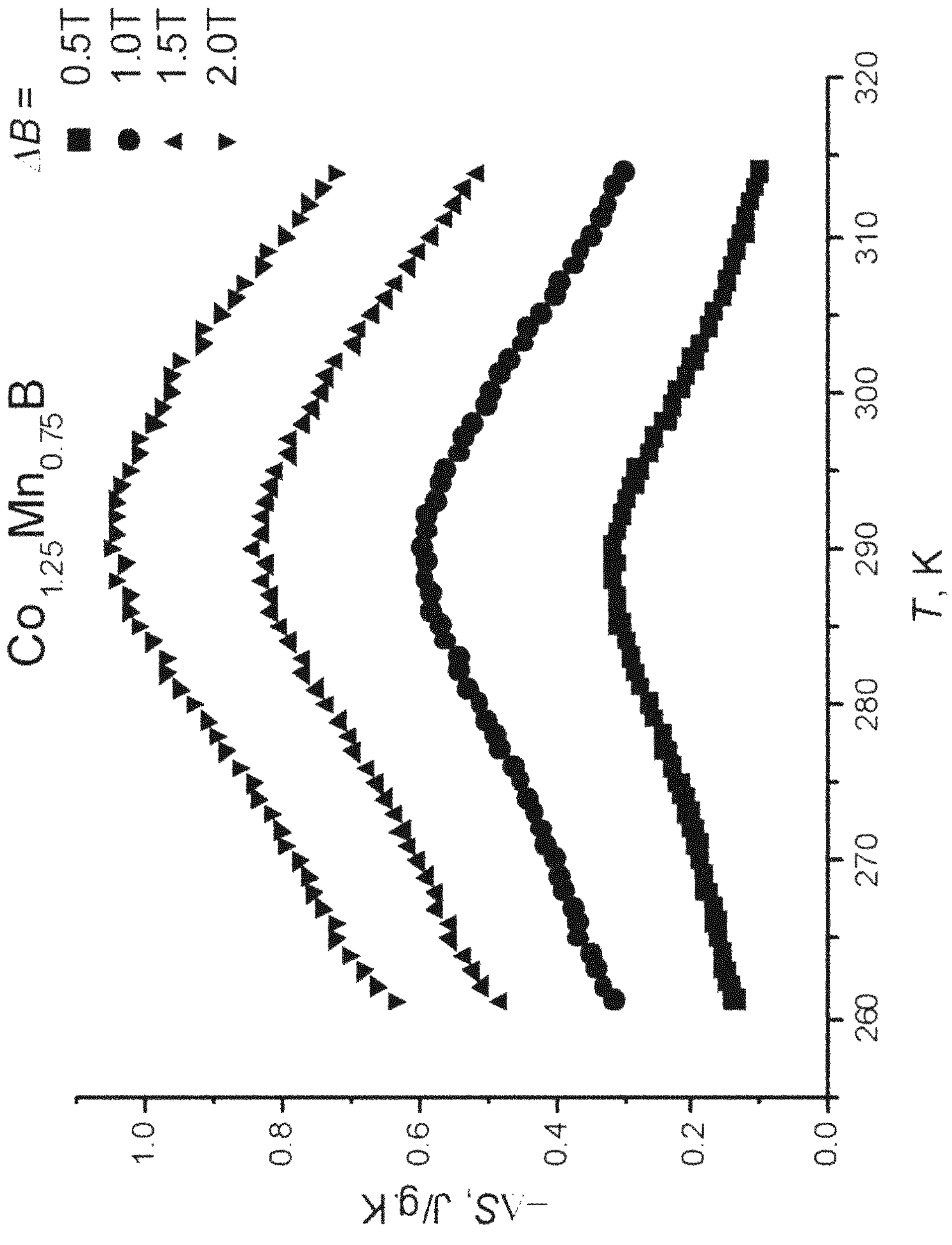
Figure 6:
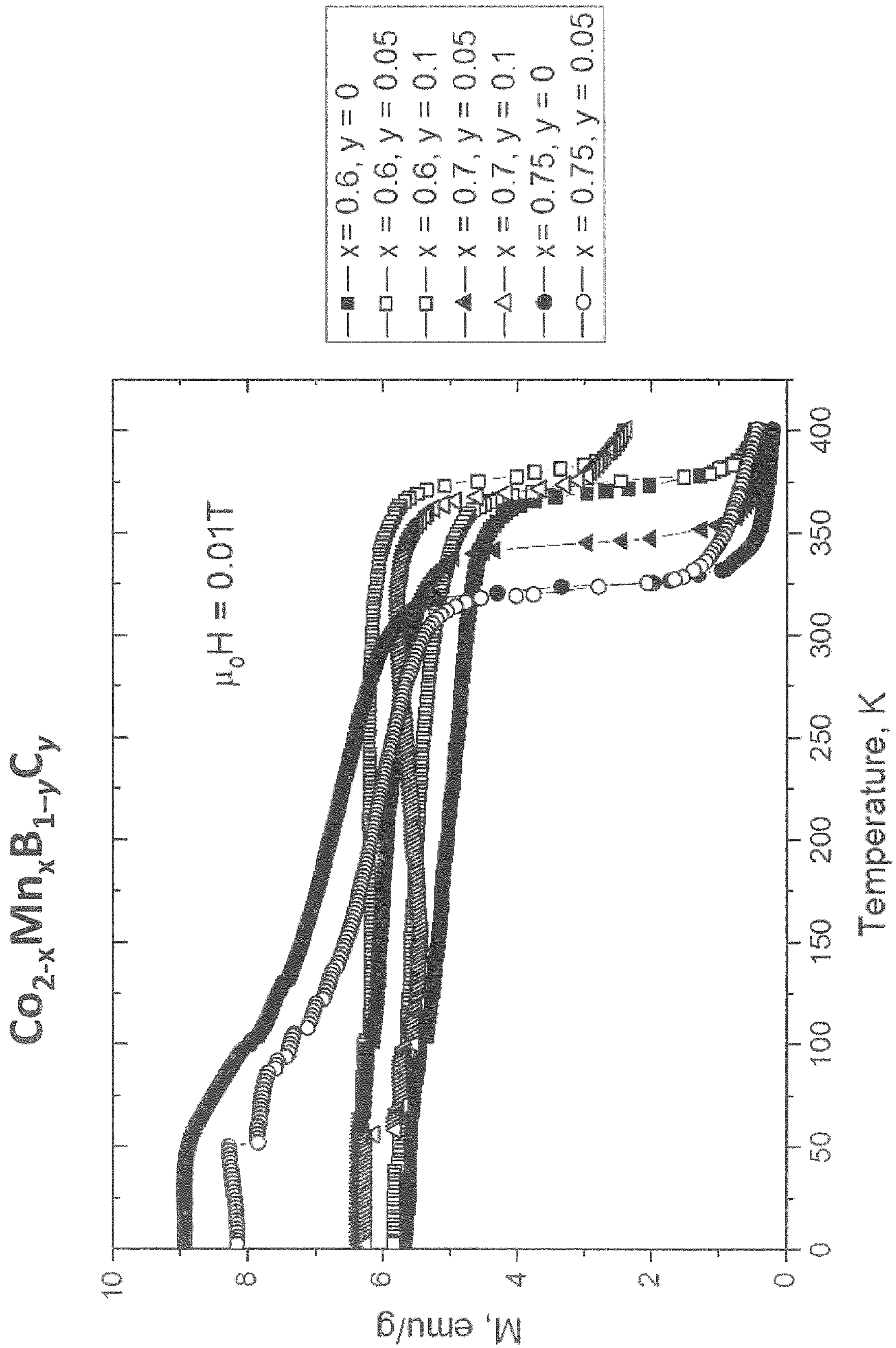

FIG. 6 shows the specific magnetization (M) as a function of temperature (T) at a magnetic field strength of 0.01 T for the materials listed in table 3. As in FIG. 3 it can be seen that the Curie temperature decreases continuously with increasing content of manganese.

TABLE 3

| x | y | Tc/[K] |
|---|---|---|
| 0.6 | 0 | 371.4 |
| 0.6 | 0.05 | 375.4 |
| 0.6 | 0.1 | 379.7 |

TABLE 3-continued

| x | y | Tc/[K] |
|---|---|---|
| 0.7 | 0.05 | 345.9 |
| 0.7 | 0.1 | 369.1 |
| 0.75 | 0 | 325.2 |
| 0.75 | 0.05 | 326.9 |

Figure 7:
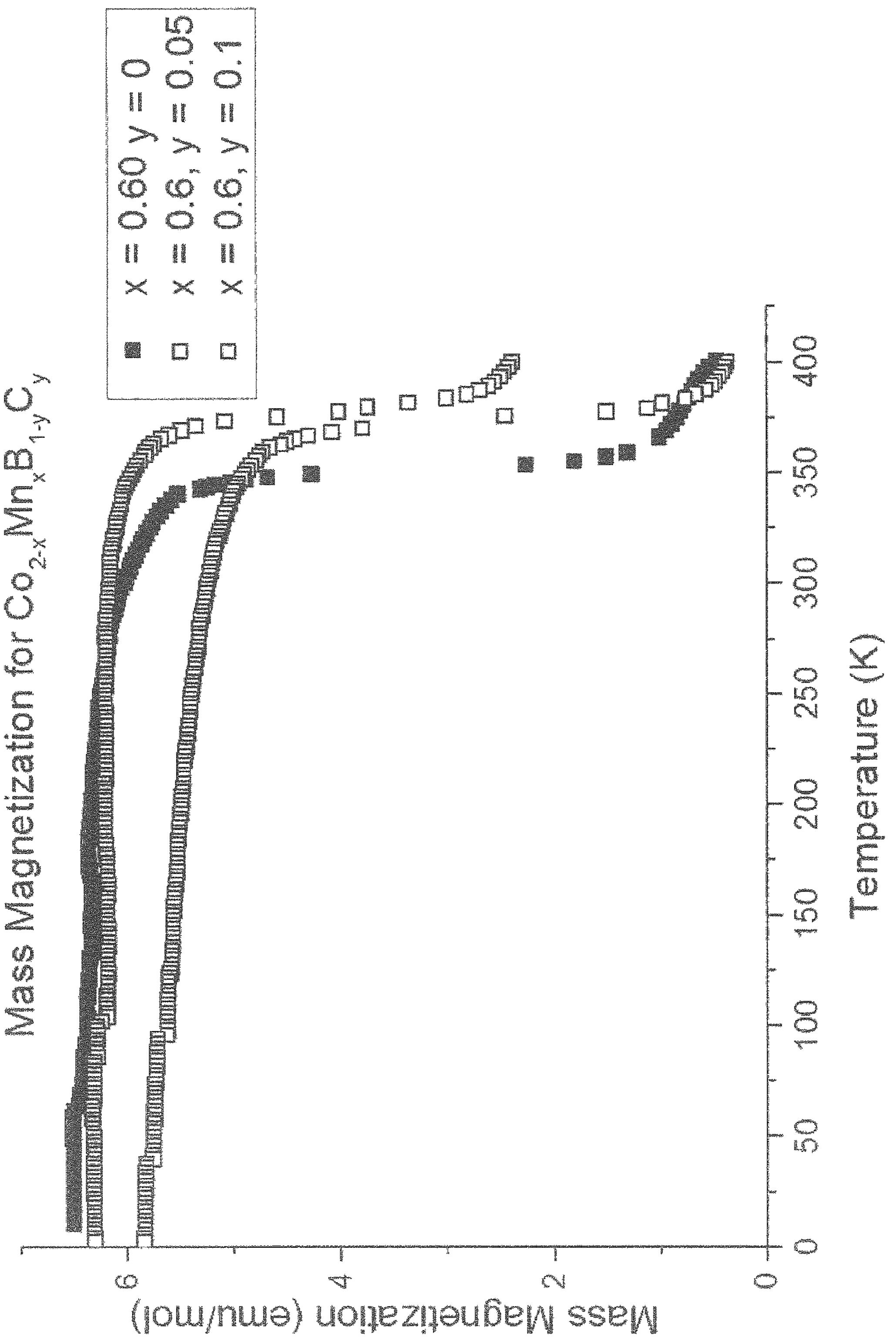

FIG. 7 shows the specific magnetization (M) as a function of temperature (T) at a magnetic field strength of 0.01 T of materials having a composition $Co_{14}Mn_{0.6}B_{1-y}C_y$, with y=0, 0.05 and 0.1. It can be seen from FIG. 7 and table 3 that the Curie temperature slightly increases with the substitution of carbon for boron.

Comparison of the Curie temperatures of those materials in table 3 with y=0 with the Curie temperature of materials having the same manganese content x in table 1 shows that the increased annealing time in step (d) (96 hours for the materials in table 1 vs. 168 hours for the materials in table 3) results in an increase of the Curie temperature. Thus, the Curie temperature can be varied by means of changing the chemical composition as well as by means of changing the annealing time in step (d).

The invention also relates to the following embodiments:

1. A magnetocaloric regenerator comprising one or more materials having a composition according to formula (I)

$$Co_{2-x}Mn_xB \quad (I)$$

wherein $0.5 \leq x \leq 1$.

2. The magnetocaloric regenerator according to embodiment 1, wherein one or more of said materials have a composition according to formula (II)

$$Co_{2-x}Mn_xB \quad (II)$$

wherein $0.5<x<1$ with the proviso that x is not one of 0.6, 0.7 and 0.8.

3. The magnetocaloric regenerator according to embodiment 1, wherein one or more of said materials have a composition according to formula (I)

$$Co_{2-x}Mn_xB \quad (I)$$

wherein $0.65 \leq x \leq 0.85$.

4. The magnetocaloric regenerator according to any preceding embodiment, wherein the magnetocaloric regenerator comprises a cascade comprising three or more different materials each having a composition according to formula (I), preferably 5 to 100 different materials each having a composition according to formula (I), wherein in said cascade said materials are arranged in succession by ascending or descending Curie temperature.

5. The magnetocaloric regenerator according to embodiment 4, wherein said materials having a composition according to formula (I) have Curie temperatures in the range of from 160 K to 390 K, preferably of from 220 K to 330 K.

6. The magnetocaloric regenerator according to embodiment 4 or 5, wherein in said cascade the temperature difference between two succeeding materials having a composition according to formula (I) is in each case in the range of from 0.5 K to 6 K, preferably 0.5 to 4 K and even more preferably 0.5 to 2.5 K.

7. Use of a material having a composition according to the general formula (I)

$$Co_{2-x}Mn_xB \quad (I)$$

wherein $0.5 \leq x \leq 1$ in a magnetocaloric regenerator.

8. A device selected from the group consisting of refrigeration systems, climate control units, air conditioning devices, thermomagnetic power generators, heat exchangers, heat pumps, magnetic actuators and magnetic switches.

said device comprising a magnetocaloric regenerator according to any of embodiments 1 to 6.

9. Use of a magnetocaloric regenerator according to any of embodiments 1 to 6 in a device selected from the group consisting of refrigeration systems, climate control units, air conditioning devices, thermomagnetic power generators, heat exchangers, heat pumps, magnetic actuators and magnetic switches.

10. A process for producing a magnetocaloric regenerator according to any of embodiments 1 to 6, wherein said process comprises preparing or providing one or more materials having a composition according to formula (I)

$$Co_{2-x}Mn_xB \quad (I)$$

wherein $0.5 \leq x \leq 1$.

11. The process according to embodiment 10, wherein preparing a material having a composition according to formula (I) comprises the steps of (a) providing a mixture of precursors comprising atoms of the elements cobalt, manganese and boron and (b) reacting the mixture provided in step (a) to obtain a solid reaction product, comprising (b-1) reacting the mixture provided in step (a) in the solid phase obtaining a solid reaction product and/or (b-2) transferring the mixture provided in step (a) or the solid reaction product obtained in step (b-1) into the liquid phase and reacting it in the liquid phase obtaining a liquid reaction product, and transferring the liquid reaction product into the solid phase obtaining a solid reaction product, and (c) optionally shaping of the solid reaction product obtained in step (b) to obtain a shaped solid reaction product, and (d) heat treatment of the solid reaction product obtained in step (b-1) or (b-2) or of the shaped solid reaction product obtained in step (c) to obtain a heat treated product, and (e) cooling the heat treated product obtained in step (d) to obtain a cooled product, and (f) optionally shaping of the cooled product obtained in step (e).

12. Process according to embodiment 11, wherein said mixture of precursors comprises one or more substances selected from the group consisting of elemental cobalt, elemental manganese, elemental boron, borides of cobalt, borides of manganese.

13. Process according to embodiment 11 or 12, wherein in step (b-2) transferring the mixture provided in step (a) or the solid reaction product obtained in step (b-1) into the liquid phase comprises arc-melting.

14. Process according to any of embodiments 11 to 13, wherein in step (b-2) transferring the mixture provided in step (a) into the liquid phase comprises arc-melting and transferring the obtained liquid reaction product into the solid phase comprises casting the obtained melt into an ingot, and step (b-2) optionally comprises up to 6 times remelting the obtained ingot and recasting the obtained melt into a recast ingot.

15. Process according to any of embodiments 11 to 14 wherein in step (d) the heat treatment comprises holding the solid reaction product obtained in step (b) or the shaped solid reaction product obtained in step (c) at a temperature in the range of from 1000 K to 1300 K, over a duration of from 10 to 170 hours, and in step (e) the heat treated product obtained in step (d) is cooled by quenching at a cooling rate of at least 10K/s, or by furnace cooling.

The invention claimed is:

1. A material according to formula (I)

$$Co_{2-x}Mn_xB_{1-y}C_y \quad (I)$$

wherein $$0.5 \leq x \leq 1 \text{ and}$$

$$0 < y \leq 0.5.$$

2. The material according to claim 1, wherein $$0.01 \leq y \leq 0.5.$$

3. The material according to claim 1, wherein $$0.5 \leq x \leq 0.9.$$

4. The material according to claim 1, wherein $$0.02 \leq y \leq 0.2, \text{ and}$$

$$0.55 \leq x \leq 0.8.$$

5. The material according to claim 1, wherein said material is selected from the group consisting of:

$Co_{1.4}Mn_{0.6}B_{0.09}C_{0.05}$,
$Co_{1.4}Mn_{0.6}B_{0.9}C_{0.1}$,
$Co_{1.3}Mn_{0.7}B_{0.95}C_{0.05}$,
$Co_{1.3}Mn_{0.7}B_{0.9}C_{0.1}$,
$Co_{1.25}Mn_{0.75}B_{0.95}C_{0.05}$, and
$Co_{1.25}Mn_{0.75}B_{0.9}C_{0.1}$.

* * * * *